US012726078B2

(12) United States Patent
Weflen

(10) Patent No.: US 12,726,078 B2
(45) Date of Patent: Sep. 1, 2026

(54) SYSTEM AND METHOD FOR POWER GENERATION

(71) Applicant: Darryl Weflen, Edmonton (CA)

(72) Inventor: Darryl Weflen, Edmonton (CA)

(*) Notice: Subject to any disclaimer, the term of this patent is extended or adjusted under 35 U.S.C. 154(b) by 0 days.

(21) Appl. No.: 18/700,467

(22) PCT Filed: Oct. 11, 2022

(86) PCT No.: PCT/CA2022/051494
§ 371 (c)(1),
(2) Date: Apr. 11, 2024

(87) PCT Pub. No.: WO2023/060342
PCT Pub. Date: Apr. 20, 2023

(65) Prior Publication Data

US 2024/0405638 A1 Dec. 5, 2024

Related U.S. Application Data

(60) Provisional application No. 63/255,205, filed on Oct. 13, 2021.

(51) Int. Cl.
*H02K 7/18* (2006.01)
*F28F 13/00* (2006.01)

(52) U.S. Cl.
CPC ............. *H02K 7/183* (2013.01); *F28F 13/00* (2013.01)

(58) Field of Classification Search
CPC ................................. H02K 7/183; F28F 13/00
See application file for complete search history.

(56) References Cited

U.S. PATENT DOCUMENTS 3,401,124 A 9/1968 Goulden
3,490,517 A * 1/1970 Gershon ............... F24F 3/1417 62/305
3,828,566 A * 8/1974 Wetzel .................... F25B 27/02 62/480
4,135,361 A * 1/1979 Eisenhaure ............... F02C 1/04 60/39.12
4,209,007 A * 6/1980 Collins ............... F24D 19/1042 126/592

(Continued)

FOREIGN PATENT DOCUMENTS

WO 2013/120998 A2 8/2013
WO 2015/179907 A1 12/2015
WO 2018/213080 A1 11/2018

OTHER PUBLICATIONS

International Seach Report and Written Opinion for PCT/CA2022/051494, Jan. 5, 2023, 8 pp.

*Primary Examiner* — Tulsidas C Patel
*Assistant Examiner* — Thomas K Quigley
(74) *Attorney, Agent, or Firm* — James A. Sheridan; Sheridan Law, LLC

(57) ABSTRACT

A system and method are provided for generating electrical power or rotational power where the system includes heating thermo-dynamic fluid passing through a heat exchanger causing the fluid to expand and then pass through a turbine to rotate a turbine shaft coupled to an electrical generator to generate electrical power, or to transfer rotational power to rotating machinery. Fluid exiting the turbine can then be cooled before cycling through to the heat exchanger.

13 Claims, 2 Drawing Sheets

(56) References Cited

U.S. PATENT DOCUMENTS 4,347,711 A * 9/1982 Noe ...................... F01K 23/101 60/39.181
4,761,261 A * 8/1988 Garabedian .......... G21C 13/024 376/290
5,237,827 A * 8/1993 Tchernev ................ F03G 6/005 62/480
6,418,747 B1 * 7/2002 Mullen ................... F04B 19/24 62/434
6,605,190 B1 * 8/2003 Salamon .................. B01D 3/14 203/1
7,430,865 B2 * 10/2008 Filippone ................ F02B 75/34 60/670
7,455,101 B2 * 11/2008 Hsu ......................... F04B 19/24 290/55
7,492,052 B2 * 2/2009 Stumm ................... F01K 27/00 290/2
8,353,162 B2 * 1/2013 Nagurny ................... F03G 7/05 60/641.1
9,863,282 B2 * 1/2018 Hart ........................ F01K 3/185
9,932,830 B2 * 4/2018 Laughlin ................... F01D 1/02
10,082,045 B2 * 9/2018 Larochelle .............. F01K 7/165
10,082,104 B2 * 9/2018 Apte ......................... F01K 3/02
10,094,219 B2 * 10/2018 Laughlin ................... F01L 1/02
10,221,775 B2 * 3/2019 Apte ....................... F01K 13/00
10,233,787 B2 * 3/2019 Larochelle .............. F25B 13/00
10,233,833 B2 * 3/2019 Apte ......................... F02C 1/04
10,436,109 B2 * 10/2019 Apte ....................... F01K 23/10
10,801,404 B2 * 10/2020 Apte ......................... F02C 1/05
10,907,510 B2 * 2/2021 Larochelle ................ F25B 9/06
10,907,513 B2 * 2/2021 Laughlin ................... F01K 5/00
10,907,548 B2 * 2/2021 Apte .................... B01D 53/265
10,920,667 B2 * 2/2021 Apte ......................... F02C 1/04
10,920,753 B2 * 2/2021 Stewart ................... F03G 4/031
11,053,847 B2 * 7/2021 Apte ................... F28D 20/0056
11,174,715 B2 * 11/2021 Atisele .................... E21B 43/24
11,187,148 B1 * 11/2021 MacDonald ............ F01K 23/10
11,396,826 B2 * 7/2022 Bollinger ................ F01D 15/10
11,454,167 B1 * 9/2022 Bollinger ............ F28D 20/0056
11,454,168 B2 * 9/2022 Apte ......................... F02C 1/10
11,578,693 B1 * 2/2023 McBride ................. F03C 1/002
11,655,759 B2 * 5/2023 Apte .................... H02K 7/1823 290/52
11,767,824 B2 * 9/2023 Saavedra ................ F03G 6/003 290/1 R
11,767,825 B2 * 9/2023 Saavedra ................ F03G 6/003 290/1 R
11,772,810 B2 * 10/2023 Peyron ................... B64D 27/18 244/57
12,000,369 B2 * 6/2024 Lynch ..................... F03G 6/065
2002/0066270 A1 * 6/2002 Rouse ..................... F01K 25/08 60/645
2004/0083731 A1 * 5/2004 Lasker ...................... F02C 6/00 60/645
2004/0211182 A1 * 10/2004 Gould ..................... F01K 13/00 60/645
2009/0125152 A1 * 5/2009 Skowronski .............. F01K 7/40 60/659
2009/0277400 A1 * 11/2009 Conry ................... F02B 39/085 123/41.19
2010/0101621 A1 * 4/2010 Xu .......................... F24S 20/20 136/206
2010/0156111 A1 * 6/2010 Pesce ...................... F03G 6/004 290/1 A
2010/0156112 A1 * 6/2010 Held ....................... F01K 7/165 290/1 A
2011/0016863 A1 * 1/2011 Ernst ....................... F01K 25/10 60/660
2013/0234439 A1 * 9/2013 Mirmobin ............ H02K 7/1823 60/645
2014/0028033 A1 * 1/2014 Mirmobin ................. F03G 7/04 60/671
2014/0070533 A1 * 3/2014 Li ........................... F01K 25/08 290/2
2014/0103661 A1 * 4/2014 Kacludis ................... F02C 1/04 290/54
2014/0109573 A1 * 4/2014 Kalina .................... F03G 4/035 60/641.1
2014/0224469 A1 * 8/2014 Mirmobin ............... F01K 13/02 165/244
2014/0271284 A1 * 9/2014 Gray ........................ H02K 9/06 310/90
2014/0311167 A1 * 10/2014 Hugenroth ................ F25B 9/14 62/6
2015/0260463 A1 * 9/2015 Laughlin ................. F24S 60/10 165/104.31
2016/0032783 A1 * 2/2016 Howes ...................... F01K 3/06 60/659
2017/0201158 A1 * 7/2017 Lear .......................... F02G 5/02
2018/0179914 A1 * 6/2018 Larochelle .............. F01K 13/02
2018/0179917 A1 * 6/2018 Apte ..................... F01K 25/103
2018/0179955 A1 * 6/2018 Apte ....................... F28F 13/14
2018/0179960 A1 * 6/2018 Apte ......................... H02P 9/04
2018/0187566 A1 * 7/2018 Gaia ..................... F01D 11/003
2018/0187595 A1 * 7/2018 Apte ......................... F02C 1/05
2018/0187597 A1 * 7/2018 Apte .................... H02K 7/1823
2018/0187627 A1 * 7/2018 Apte ....................... F02C 1/105
2019/0003308 A1 * 1/2019 Laughlin ................... F01L 1/02
2019/0162082 A1 * 5/2019 Larochelle ................ F02C 1/10
2019/0162116 A1 * 5/2019 Apte ....................... F03G 6/064
2019/0162122 A1 * 5/2019 Apte ....................... F28D 20/00
2020/0191020 A1 * 6/2020 Delahanty ................. F01P 5/10
2020/0317358 A1 * 10/2020 Peyron ................... B64D 29/02
2021/0180522 A1 * 6/2021 Apte ......................... F02C 1/10
2022/0025816 A1 * 1/2022 Corbin ...................... F02C 9/00
2022/0153426 A1 * 5/2022 Holley .................. F01K 25/103
2022/0178268 A1 * 6/2022 Angel ..................... F01D 15/12
2023/0184207 A1 * 6/2023 Lynch ..................... F03C 1/002 60/659
2023/0296049 A1 * 9/2023 Apte ....................... F01K 23/10 290/52
2024/0280074 A1 * 8/2024 Lynch ................. F28D 20/0034

* cited by examiner

SYSTEM AND METHOD FOR POWER GENERATION

CROSS-REFERENCE TO RELATED APPLICATIONS

This application claims priority of U.S. Provisional Patent Application Ser. No. 63/255,205 filed 13 Oct. 2021, which is incorporated by reference into this application in its entirety.

TECHNICAL FIELD

The present disclosure is related to the field of generating electrical power, in particular, generating electrical power using thermodynamic heat transfer.

BACKGROUND

Manufacturing and industrial processes can produce a source of latent heat and/or sensible heat that can be used to generate electrical power or rotational that can be used for other purposes.

It is, therefore, desirable to provide a system and method that can use latent and/or sensible heat produced by manufacturing and industrial processes to generate electrical or rotational power.

SUMMARY

A system and method for generating power is provided.

Broadly stated, in some embodiments, a system can be provided for generating power, the system comprising: a first heat exchanger comprising a first inlet and a first outlet; a second heat exchanger comprising second inlet and a second outlet, the second inlet operatively coupled to the first outlet via a first conduit; a turbine comprising a third inlet and a third outlet, the third inlet operatively coupled to the second outlet via a second conduit, the turbine comprising a rotating turbine shaft disposed therein, the rotating turbine shaft is configured to rotate when the thermo-dynamic fluid flows from the third inlet to the third outlet, the third outlet operatively coupled to the first inlet via a third conduit; thermo-dynamic fluid disposed in the said heat exchangers, said conduits and the turbine; wherein the first heat exchanger is configured to extract heat from the thermo-dynamic fluid as it passes through the first heat exchanger; and wherein the first heat exchanger is configured to transfer heat to the thermo-dynamic fluid as it passes through the second heat exchanger thereby causing the thermo-dynamic fluid to exit the second outlet thereof and enter the third inlet of the turbine to rotate the rotating turbine shaft.

Broadly stated, in some embodiment, the system can further comprise a one-way valve disposed in the third conduit, the one-way valve configured to only allow flow of the thermo-dynamic fluid through the third conduit from the third outlet to the first inlet.

Broadly stated, in some embodiments, the system can further comprise an expansion tank disposed in the third conduit, the expansion tank configured to maintain the thermo-dynamic fluid at a predetermined minimum pressure.

Broadly stated, in some embodiments, the system can further comprise a thermally-controlled valve disposed in the third conduit.

Broadly stated, in some embodiments, the thermally-controlled valve can be configured to control the flow of the thermo-dynamic fluid based on a temperature of the thermo-dynamic fluid in one or both of the first and second heat exchangers.

Broadly stated, in some embodiments, the system can further comprise a cut-off valve disposed in or more of the first, second and third conduits.

Broadly stated, in some embodiments, the system can further comprise an air vent valve disposed in the third conduit, the air vent valve configured to remove air trapped within the system.

Broadly stated, in some embodiments, the system can further comprise a connection fitting disposed in the third conduit, the connection fitting configured for ingress of the thermo-dynamic fluid into the system.

Broadly stated, in some embodiments, the system can further comprise an electrical generator operatively coupled to the rotating turbine shaft, whereupon rotation of the rotating turbine shaft thereby results in the electrical generator producing electrical power therefrom.

Broadly stated, in some embodiments, the system can further comprise rotating machinery operatively coupled to the rotating turbine shaft, whereupon rotation of the rotating turbine shaft results in rotational power being transferred therefrom to the rotating machinery.

Broadly stated, in some embodiments, a method can be provided for generating power, comprising: passing thermo-dynamic fluid through a first heat exchanger configured to cool the thermo-dynamic fluid; passing the cooled thermo-dynamic fluid through a second heat exchanger configured to heat the thermo-dynamic fluid; passing the heated thermo-dynamic fluid through a turbine to rotate a rotating turbine shaft; and then returning the thermo-dynamic fluid exiting the turbine to the first heat exchanger.

Broadly stated, in some embodiments, the method can further comprise passing the thermo-dynamic fluid exiting the turbine through a one-way valve before the thermo-dynamic fluid is returned to the first heat exchanger, the one-way valve configured to prevent the thermo-dynamic fluid exiting from the turbine from flowing back into the turbine.

Broadly stated, in some embodiments, the method can further comprise passing the thermo-dynamic fluid exiting the one-way valve through a thermally-controlled valve before the thermo-dynamic fluid is returned to the first heat exchanger, the thermally-controlled valve controlled to control the flow of the thermo-dynamic fluid based on a temperature thereof in one or both of the first and second heat exchangers.

Broadly stated, in some embodiments, the method can further comprise rotating an electrical generator with the rotating turbine shaft thereby resulting in the electrical generator producing electrical power.

Broadly stated, in some embodiments, the method can further comprise coupling rotating machinery to the rotating turbine shaft, whereupon rotating the rotating turbine shaft results in rotational power being transferred therefrom to the rotating machinery.

DETAILED DESCRIPTION OF EMBODIMENTS

Figure 1:
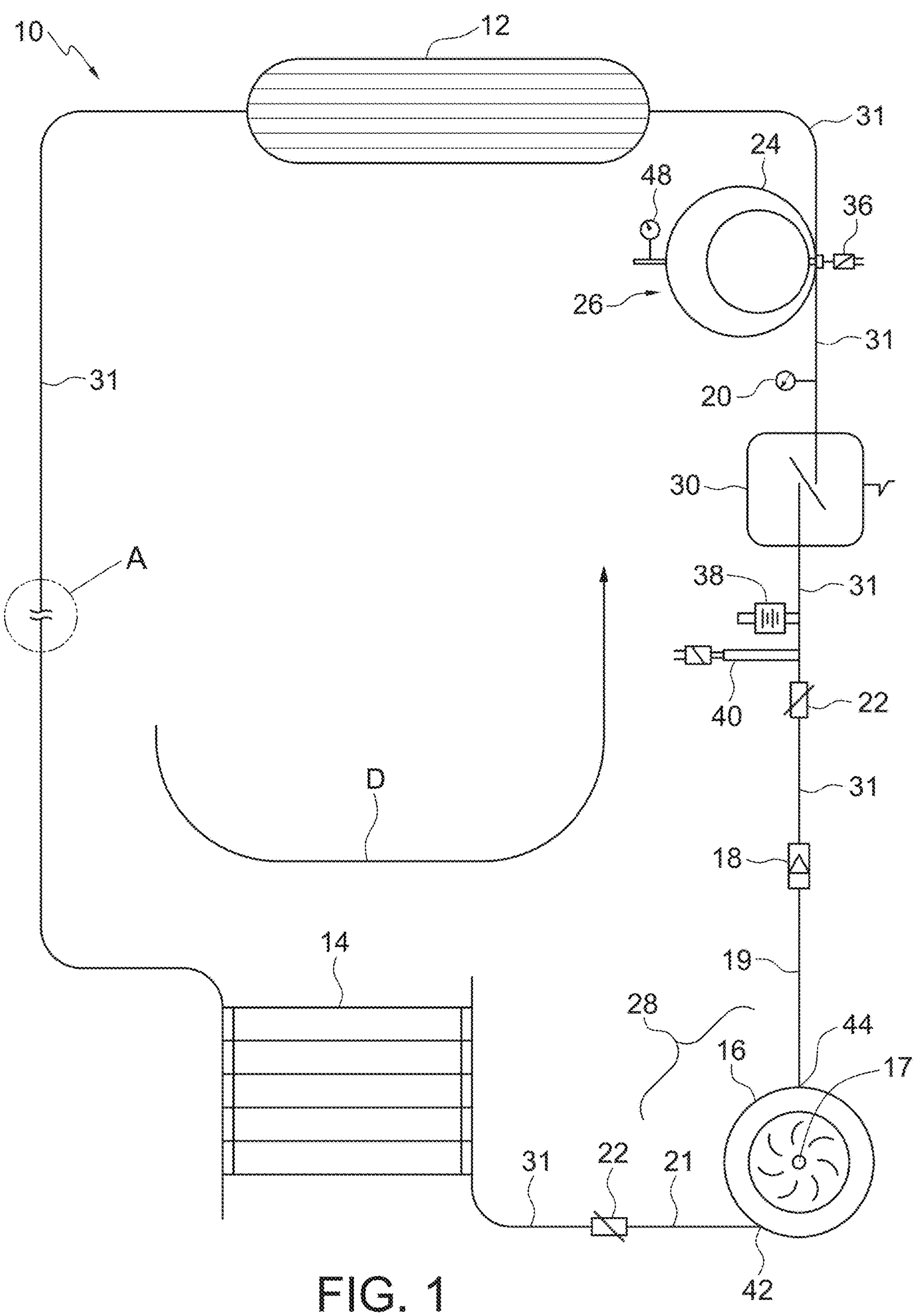
FIG. 1 is a block diagram depicting one embodiment of a system for generating electrical power using thermodynamic heat transfer.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment can also be included in other embodiments but is not necessarily included. Thus, the present technology can include a variety of combinations and/or integrations of the embodiments described herein.

The presently disclosed subject matter is illustrated by specific but non-limiting examples throughout this description. The examples may include compilations of data that are representative of data gathered at various times during the course of development and experimentation related to the present invention(s). Each example is provided by way of explanation of the present disclosure and is not a limitation thereon. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

All references to singular characteristics or limitations of the present disclosure shall include the corresponding plural characteristic(s) or limitation(s) and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

While the following terms used herein are believed to be well understood by one of ordinary skill in the art, definitions are set forth to facilitate explanation of the presently disclosed subject matter.

Unless defined otherwise, all technical and scientific terms used herein have the same meaning as commonly understood by one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in this application, including the claims.

Unless otherwise indicated, all numbers expressing quantities, properties, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently disclosed subject matter.

As used herein, the term "about", when referring to a value or to an amount of mass, weight, time, volume, concentration or percentage is meant to encompass variations of in some embodiments +/−50%, in some embodiments +/−40%, in some embodiments +/−30%, in some embodiments +/−20%, in some embodiments +/−10%, in some embodiments +/−5%, in some embodiments +/−1%, in some embodiments +/−0.5%, and in some embodiments +/−0.1% from the specified amount, as such variations are appropriate to perform the disclosed method.

Alternatively, the terms "about" or "approximately" can mean within an acceptable error range for the particular value as determined by one of ordinary skill in the art, which will depend in part on how the value is measured or determined, i.e., the limitations of the measurement system. For example, "about" can mean within 3, or more than 3, standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value. Unless otherwise indicated, all numbers expressing quantities, properties, and so forth used in the specification and claims are to be understood as being modified in all instances by the term "about". And so, the numerical parameters set forth in this specification and claims are approximations that can vary depending upon the desired properties sought to be obtained by the presently disclosed subject matter.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

Figure 2:
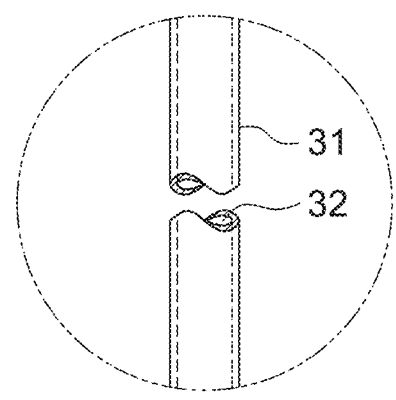
FIG. 2 is a cutaway view depicting a close-up view of feature "A" of FIG. 1.
Figure 3:
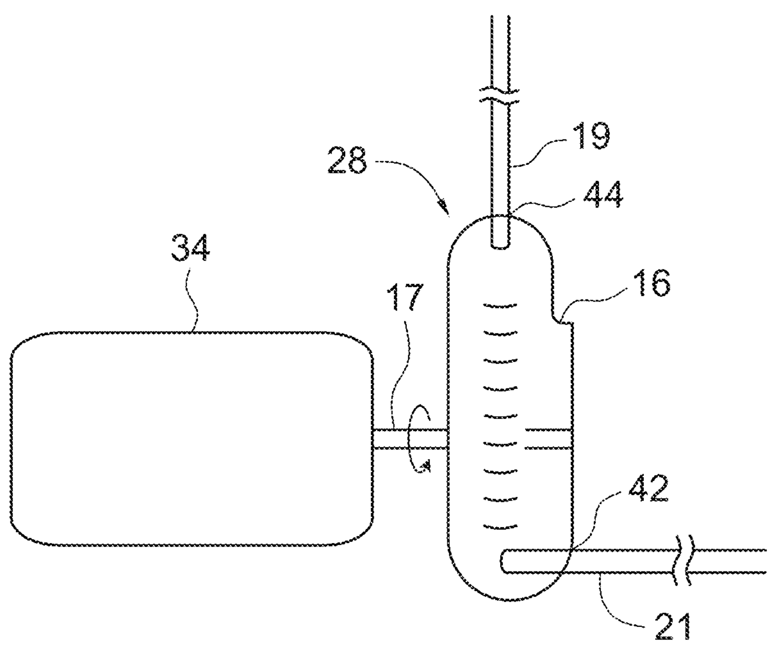
FIG. 3 is a block diagram depicting a turbine and generator for use with the system of FIG. 1.

A system and method using the thermodynamic law of convection applied in a closed loop system to generate electrical power is provided. Referring to FIGS. 1 to 3, one embodiment of system 10 is shown, wherein system 10 can be configured to induce motion in an impeller or turbine creating a useful rotational motion that can be converted to electrical power through a generator, either directly coupled thereto or through a drive mechanism consisting of pulleys and/or gears, a variable speed drive ("VSD") or other functionally equivalent mechanism as well known to those skilled in the art. In some embodiments, system 10 can uses the thermal (ie., temperature) difference between two separate temperature zones, wherein within each temperature zone can be a contained thermo-fluid (such as water, a coolant, a refrigerant or other functionally equivalent thermo-fluid for transferring heat as well known to those skilled in the art) within a tube, pipe hose or other sealed containment system that allows heat transfer from the surrounding ambient medium into the contained thermo-fluid and also allowing thermal transfer from the thermo-fluid into the surrounding medium.

In some embodiments, system 10 can comprise of a cool temperature zone, represented as heat exchanger 12, operatively coupled to a warm temperature zone, represented as heat exchanger 14, wherein thermo-dynamic fluid 32 can flow from an outlet of heat exchanger 12 to an inlet of heat exchanger 14 via conduit 31. Thermo-dynamic fluid 32 can then flow from an outlet of heat exchanger 12 into an inlet of turbine 16. Thermo-dynamic fluid 32 can then flow from an outlet of turbine 16 through one-way check valve 18, then through thermally-controlled valve 30, and then, eventually, to an inlet of heat exchanger 12.

In some embodiments, a differential in temperatures between the cool zone and the warm zone can create convective flow of thermo-dynamic fluid 32 within sealed system 10, shown as direction "D" in FIG. 1, as the warm temperature zone (heat exchanger 14) can transfer heat into thermo-dynamic fluid 32 whereupon thermo-dynamic fluid 32 can expand and then moves towards the cool temperature zone (heat exchanger 12). As thermo-dynamic fluid 32 cools in the cool temperature zone (heat exchanger 12), it can be drawn back into the warm temperature zone (heat exchanger 14) via convective flow of fluid 32 in system 10. Thermo-dynamic fluid 32 exiting heat exchanger 14 can then flow through conduit 21 into inlet 42 of turbine/impeller 16 thereby causing a rotational motion on rotating turbine shaft 17. Rotation of shaft 17 can then, in turn, provide rotational drive to generator 34. As thermo-dynamic fluid 32 exits outlet 44 of turbine 16, thermo-dynamic fluid 32 can flow through conduit 19 to one-way check valve 18 as thermo-dynamic fluid 32 flows along direction "D" through heat exchanger 12 and returns to the warm temperature zone (heat exchanger 14), as shown in FIG. 1. One-way check valve 18 can prevent thermo-dynamic fluid 32 from flowing back into outlet 44 and can maintain the flow of thermo-dynamic fluid 32 in direction "D" in system 10. In some embodiments, heat exchangers 12 and 14 can comprise of a length or lengths of a containment mechanism (such as tubing, a casting, an extrusion, a radiator, or other functionally equivalent heat exchanging device as well known to those skilled in the art). In some embodiments, one or both of heat exchangers 12 and 14 can comprise a header or manifold system and can also comprise a sealed vessel/storage tank in conjunction with other containment materials. In some embodiments, system 10 can further comprise expansion tank 24, or other functionally equivalent device) operatively coupled to conduit 31 to maintain a predetermined internal minimum system pressure on thermo-dynamic fluid 32. In some embodiments, system 10 can further comprise of a fill device or valve 48 and drain valve 36 operatively coupled to expansion tank 24. In some embodiments, system 10 can comprise pressure indicator 20 operatively coupled to conduit 31 to monitor the system pressure of thermo-dynamic fluid 32. In some embodiments, system 10 can comprise air eliminator device or air vent valve 38 operatively coupled to conduit 31 located at a physical high elevation point of conduit 31 of system 10 so as to enable capture of any air trapped within conduit 31 and to release the captured air from conduit 31 to the atmosphere. In a representative embodiment, a model VTP050 air release valve as manufactured by Spiroterm, Inc. of Glendale Heights, Illinois, U.S.A.

In some embodiments, system 10 can comprise connection fitting 40 operatively coupled to conduit 31 for vacuum extraction of any air within conduit 31 using an external vacuum source as well known to those skilled in the art, and to aid in filling conduit 31 with thermo-dynamic fluid 32 so as to ensure maximum efficiency. In some embodiments, system 10 can comprise thermally actuated control valve 30 that can be controlled by the temperature of thermo-dynamic fluid 32 within one or both of heat exchangers 12 and 14, or on a differential of the temperature of thermo-dynamic fluid 32 between heat exchangers 12 and 14, wherein valve 30 can be configured to stop or restrict flow of thermo-dynamic fluid 32 through system 10. In some embodiments, system 10 can comprise one or more valves 22 disposed on conduits 19, 21 and 31 to allow servicing of system 10 or of generator 34 without draining the entire system of thermo-dynamic fluid 32.

In some embodiments, system 10 can be used to absorb waste heat from a manufacturing process with heat exchanger 14, and can further use the thermal sink of a large reservoir of water with heat exchanger 12, or heat exchanger 12 can comprise an air cooled heat exchanger, to create the convective flow of fluid 32 within system 10 to drive turbine/impeller 16 to generate rotational energy for use in generating electrical power, via generator 34, or to operate other machinery or equipment requiring rotational power input, such as a water pump, fan or shaft to rotate other machinery.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:

1. A system for generating power, the system comprising:

a) a first heat exchanger disposed in a first temperature zone, the first heat exchanger configured as a thermal sink, the first heat exchanger comprising a first inlet and a first outlet;

b) a second heat exchanger disposed in a second temperature zone for absorbing heat, the second heat exchanger comprising a second inlet and a second outlet, the second inlet operatively coupled to the first outlet via a first conduit, and wherein there is a temperature differential between the first and second temperature zones;

c) a turbine comprising a third inlet and a third outlet, the third inlet operatively coupled to the second outlet via a second conduit, the turbine comprising a rotating turbine shaft disposed therein, the third outlet operatively coupled to the first inlet via a third conduit;

d) thermo-dynamic fluid disposed in the system, wherein the thermo-dynamic fluid flows through the first and second heat exchangers, through the first, second, and third conduits, and through the turbine due solely to convective flow caused by the temperature differential of the thermo-dynamic fluid between the first and second temperature zones and without aid of a pump pumping the thermo-dynamic fluid;

e) a one-way check valve disposed in the third conduit, the one-way valve configured to only allow flow of the thermo-dynamic fluid through the third conduit from the third outlet to the first inlet; and f) wherein the thermo-dynamic fluid is heated by the second heat exchanger as it passes through the second heat exchanger; and g) wherein the heated thermo-dynamic fluid exits the second outlet and enters the third inlet to rotate the rotating turbine shaft of the turbine before exiting the third outlet; and h) wherein the thermo-dynamic fluid exiting the third outlet passes through the one-way check valve to enter the first heat exchanger to be cooled as the thermo-dynamic fluid flows through the first heat exchanger.

2. The system as set forth in claim 1, further comprising an expansion tank disposed in the third conduit, the expansion tank configured to maintain the thermo-dynamic fluid at a predetermined minimum pressure.

3. The system as set forth in claim 1, further comprising a thermally-controlled valve disposed in the third conduit.

4. The system as set forth in claim 3, wherein the thermally-controlled valve is configured to control the flow of the thermo-dynamic fluid based on a temperature of the thermo-dynamic fluid in one or both of the first and second heat exchangers.

5. The system as set forth in claim 1, further comprising a cut-off valve disposed in or more of the first, second and third conduits.

6. The system as set forth in claim 1, further comprising an air vent valve disposed in the third conduit, the air vent valve configured for removing air trapped within the system.

7. The system as set forth in claim 1, further comprising a connection fitting disposed in the third conduit, the connection fitting configured for ingress of the thermo-dynamic fluid into the system.

8. The system as set forth in claim 1, further comprising an electrical generator operatively coupled to the rotating turbine shaft, whereupon rotation of the rotating turbine shaft thereby results in the electrical generator producing electrical power therefrom.

9. The system as set forth in claim 1, further comprising rotating machinery operatively coupled to the rotating turbine shaft, whereupon rotation of the rotating turbine shaft results in rotational power being transferred therefrom to the rotating machinery.

10. A method for generating power, comprising:

a) thermo-dynamic fluid flowing through a first heat exchanger disposed in a first temperature zone, the first heat exchanger configured as a thermal sink to cool the thermo-dynamic fluid;

b) the cooled thermo-dynamic fluid flowing through a first conduit to a second heat exchanger disposed in a second temperature zone for absorbing heat, wherein there is a temperature differential between the first and second temperature zones, the second heat exchanger heating the thermo-dynamic fluid as it flows therethrough;

c) the heated thermo-dynamic fluid flowing through a second conduit to and then through a turbine to rotate a rotating turbine shaft;

d) the thermo-dynamic fluid flowing through a one-way check valve disposed in a third conduit after exiting the turbine, the one-way check valve configured to prevent the thermo-dynamic fluid exiting from the turbine from flowing back into the turbine;

e) the thermo-dynamic fluid then flowing from the one-way check valve through the third conduit to the first heat exchanger; and f) cooling the thermo-dynamic fluid as it flows through the first heat exchanger, the flow of the thermo-dynamic fluid through the first heat exchanger, the first conduit, the second heat exchanger, the second conduit, the turbine, the one-way check valve, and the third conduit due solely to convective flow caused by the temperature differential of the thermo-dynamic fluid between the first and second temperature zones and without aid of a pump pumping the thermo-dynamic fluid.

11. The method as set forth in claim 10, further comprising passing the thermo-dynamic fluid exiting the one-way check valve through a thermally-controlled valve before the thermo-dynamic fluid is returned to the first heat exchanger, the thermally-controlled valve controlled to control the flow of the thermo-dynamic fluid based on a temperature thereof in one or both of the first and second heat exchangers.

12. The method as set forth in claim 10, further comprising rotating an electrical generator with the rotating turbine shaft thereby resulting in the electrical generator producing electrical power.

13. The method as set forth in claim 10, further comprising coupling rotating machinery to the rotating turbine shaft, whereupon rotating the rotating turbine shaft results in rotational power being transferred therefrom to the rotating machinery.

* * * * *